United States Patent [19]

Kratky

[11] Patent Number: 5,533,299
[45] Date of Patent: Jul. 9, 1996

[54] NON-CIRCULATING HYDROPONIC PLANT GROWING SYSTEM

[75] Inventor: Bernard A. Kratky, Hilo, Hi.

[73] Assignee: University of Hawaii, Honolulu, Hi.

[21] Appl. No.: 357,581

[22] Filed: Dec. 16, 1994

Related U.S. Application Data

[62] Division of Ser. No. 924,992, Aug. 5, 1992, Pat. No. 5,385,589.

[51] Int. Cl.$^6$ .................................................. A01G 9/02
[52] U.S. Cl. ............................................. 47/18; 47/63
[58] Field of Search ........................... 47/18, 60 NL, 47/60 R, 62, 63

[56] References Cited

U.S. PATENT DOCUMENTS

| | | |
|---|---|---|
| Re. 21,820 | 6/1941 | Munsell . |
| 1,450,633 | 4/1923 | Hudson . |
| 2,205,303 | 6/1940 | Munsell . |
| 3,352,057 | 11/1967 | Ferrand . |
| 3,660,933 | 5/1970 | Wong . |
| 3,744,183 | 7/1973 | Kato . |
| 3,868,787 | 3/1975 | Wong . |
| 3,898,766 | 8/1975 | Goldstaub . |
| 4,037,360 | 7/1977 | Farnsworth . |
| 4,059,922 | 11/1977 | DiGiancinto . |
| 4,075,785 | 2/1978 | Jones . |
| 4,179,846 | 12/1979 | Carlisle . |
| 4,226,048 | 10/1980 | Molnar . |
| 4,279,101 | 7/1981 | Leroux . |
| 4,392,328 | 7/1983 | Walker . |
| 4,510,712 | 4/1985 | Whitcomb . |
| 4,622,775 | 11/1986 | Glenn et al. . |
| 4,763,442 | 8/1988 | Saeger . |
| 4,803,806 | 2/1989 | Ito . |
| 4,986,027 | 1/1991 | Harvey . |
| 5,117,581 | 6/1992 | Green et al. . |

FOREIGN PATENT DOCUMENTS

| | | | |
|---|---|---|---|
| 052264 | 5/1982 | European Pat. Off. . | |
| 1414605 | 9/1965 | France | 47/18 |
| 2744143 | 4/1979 | Germany . | |
| 1256328 | 10/1989 | Japan | 47/62 |
| 1039188 | 8/1966 | United Kingdom | 47/60 NL |

*Primary Examiner*—Henry E. Raduazo
*Attorney, Agent, or Firm*—James Creighton Wray

[57] ABSTRACT

The non-circulating hydroponic kit incorporates a water impervious container capable of holding a variable depth of nutrient solution and a solid container lid with a plurality of apertures through which a multitude of root-impervious tubes or frusto-conical containers can be inserted and supported. The lid stops visible light from entering the plant holding container by fitting over the container, and the reusable tubes can be of a multitude of lengths. Preferred lengths are from 5 to 9 inches long. The tubes have open tops and a plurality of apertures in the side walls, preferably ¼ to ½ inches in diameter. The tube may have a plurality of vertical foils extending inward from the side wall and downward to the lower end to deter roots from spiraling around the side walls. Nutrient solution is placed in the container and the tubes are filled with a particulate growing medium. At the start of the growing period, the tubes are immersed to a depth of 1 to 2 inches in the nutrient solution which wets the non-immersed media by capillary action. Eventually, the nutrient level is lower than the bottom of the plant tubes, but the roots are able to gather water and nutrients at this stage of growth. Thus, only the initial application of nutrient solution is needed. No additional watering or fertilization is needed. This system works best with a short-term crop such as lettuce.

5 Claims, 1 Drawing Sheet

5,533,299

NON-CIRCULATING HYDROPONIC PLANT GROWING SYSTEM

This application is a division of application Ser. No. 07/924,992 filed Aug. 5, 1992, now U.S. Pat. No. 5,385,589.

BACKGROUND OF THE INVENTION

The underlying principle of hydroponics has been used for hundreds of years as a growing method for plants. Researchers in the 1800's used the technique to determine the essential elements for the growth of plants. Today, there are many hydroponic systems which vary in complexity and cost.

According to a Gallup poll conducted in 1985, there is a trend toward smaller scale gardening by consumers. The gardening suppliers have met the demand by offering new types of containers, special types of seeds and other products designed to make such gardening easier. Factors that are contributing to the trend of container gardening include:

1. The sale of new homes on small parcels of land is expected to increase the trend of container gardening in the years ahead.
2. Smaller gardening areas are easily cared for by the aged.
3. Containers will be used in decorating the one and a half million decks that are added to homes each year.

Several companies sell gardening kits that target the container gardener. One such company offers a gift product line of gardening containers that are attractively packaged and marketed internationally. The kits wholesale for $6.00, retail for approximately $14.00 and consist of a growing container and medium, garden seeds and instructions.

Scientific supply companies sell a variety of experimental hydroponic kits and experimental plant growing kits that are marketed as educational tools.

A definite market exists for the hydroponic growing kit.

Non-circulating hydroponic systems which have a layer of screen just above the nutrient solution level to encourage rooting development and provide an anchor point for plant support are known. A major disadvantage of those systems for a high density, rapid turnover crop such as leaf lettuce (*Lactuca sativa*. L.) is the difficulty of managing the nutrient solution level while establishing the transplants.

There are many different non-circulating growing systems that have been developed. The following is a sample of hydroponic systems that can currently be found in patent and literature searches. The sample excludes the many systems offered by laboratory supply companies for sale to professional educators.

Net or Screen Planter

A PVC container holds a net bag with either vermiculite or smoked rice husks (SRH) as a growing medium. The PVC container is placed in a growing tank containing culture solution. Capillary action draws nutrient solution to the plant.

Rockwool Cube Growing Container

A plastic lined plywood growing tank contains a layer of window screening that provides root and plant support. The lid supports rockwool cubes which contain the plant and absorb the nutrient solution.

Plastic Pot Growing Container

A plastic pot containing smoked rice hulls is supported by the tank lid. A net replaces the bottom of the pot to allow the nutrient solution to be drawn from the polystyrene growing tank.

Pot Plan Nursery

Standard plastic pots or lattice pots filled with tuff were used with non-circulating or circulating nutrient solutions. The lattice pots were either supported by the floor of the tank or were suspended in the solution.

Sub-Irrigating Pot

Plastic pots containing media are immersed in a plastic lined tank containing nutrient solution. The bottom of the corrugated tank supports the pots. The polyethylene lid protects the roots from direct sunlight and is painted white to reflect the sunlight to the plant.

Apparatus for Hydroponics (U.S. Pat. No. 4,794,728)

The apparatus consists of a box made of cardboard which contains a water impermeable container. The container has at least one plant support that protrudes through the opening of the lid. A plant culture bed of porous solid medium is placed in the water impermeable container.

Indoor Multiple Purpose Hydroponic Cultivation Planter (U.S. Pat. No. 4,735,036)

The planter consists of a leak-proof structure that has an upper opening for insertion of a plant. A number of planters can be coupled to each other via a side surface having a coupling opening. The planters can be filled with porous grain fillers and water.

Planter, Especially for Hydroculture (U.S. Pat. No. 4,663,884)

This planter consists of a housing adapted to receive a pot that is formed with a root compartment for a plant. The plates have a space which communicates with the root compartment and is capable of holding a body of liquid. A float apparatus is used to maintain a constant liquid level.

Hydroponic Assembly and Wafer for Use Therein (U.S. Pat. No. 4,407,092)

The planter consists of a trough containing nutrient solution and a tray placed within the trough. The tray is interfitted with a lid and has spaced openings serving as growing stations. A compressed growing medium attached to a wick draws nutrient solution by capillary action.

Horticultural Devices (U.S. Pat. No. 4,329,812)

This planter consists of an inner container made of fibrous material that contains a growing medium. The inner fibrous container is supported by a root impervious outer container. This outer container extends into a second container that holds plant sustaining liquid. That allows the plant to be readily removed from the container.

SUMMARY OF THE INVENTION

The present hydroponic kit includes a storage container with openings in a top to support tapered plastic tubes. Growing medium is added to the tubes, and seeds are planted in the tubes and are wet from the top. After 5 to 19 days, the tubes are placed in the cover of the container, where the tubes extend down into a nutrient solution which occupies approximately the lower half of the storage container. In another embodiment, newly seeded tubes are placed directly in the cover of the container. The growing medium is supplied with nutrient solution by capillary action through the portion of the tube immersed in the solution. As the plants grow, roots spread into the solution, and the solution drops below the bottom of the tubes. No further maintenance is required until harvest.

No other hydroponic growing kits are closed systems for inserting and holding tubes first partially submerged, and then spaced from the nutrient solution without replenishment through harvesting.

The present invention is a simple hydroponic growing system. The system uses easily acquired materials: a growing container with lid, a root support system, a growing medium, seeds, and a pre-measured batch of nutrients.

The kit can grow a wide variety of plants. Experimentation with lettuce has provided the approximate quantity of nutrient water needed to grow the lettuce without refilling the container, and analysis of nutrient needs for a wide variety of plants shows that other plants can be grown in the kit.

The hydroponic kit includes the following features:

A water impervious container capable of holding a variable depth of nutrient solution;

a solid container lid with a plurality of apertures through which a multitude of root-impervious tubes or frusto-conical containers can be inserted and supported and which stops visible light from entering the plant holding container by fitting over the container; and a reusable, root-impervious tube or frusto-conical container which can be of a multitude of lengths, but is preferably 5 to 9 inches long, which has an open top and an opening on the bottom of a diameter equal to less than half of the diameter of the main shaft of the tube, and a plurality of apertures in the side walls of various sizes, preferably ¼ to ½ inches in diameter. The container may have a plurality of vertical foils extending inward from the side wall and downward to the lower end to deter roots from spiraling around the side walls.

The container is filled with a particulate growing medium. At the start of the growing period, the tubular container is immersed to a depth of 1 to 2 inches in the nutrient solution which wets the non-immersed media throughout the tube by capillary action. Eventually, the nutrient solution level may be lower than the bottom of the tubular plant container, but the roots are able to gather water and nutrients at this stage of growth. Thus, only the initial application of nutrient solution is needed. No additional watering or fertilization is needed. This system works best with a short-term crop such as lettuce.

Pre-measured rates of a nutritionally complete fertilizer are separately packaged and included in the kit, such that one packet of fertilizer is added to the water at the beginning of each growing cycle. The kit is able to accommodate a multitude of growing cycles with replacements of only the particulate growing media, a packet of fertilizer, seed and water.

While the growing kit could propagate plants on a large scale, the following areas have great potential.

The kit may be used as an education tool. Educators may use the kit to explain the process of plant cultivation and production using hydroponic principles. It is a relatively low cost system that educators can afford, and simple enough that they will not be intimidated by it.

The kit may also be used as a gardening system. The kit is suited to hobby gardeners, condominium tenants, and people who would like to grow plants but who do not want to invest in gardening tools and supplies. The kit contains everything needed to grow plants and would not require anything other than the addition of water to the kit.

The growing kit is a relatively simple, low cost, self contained system that requires little or no attention once the initial planting has been done.

As with virtually all other hydroponic growing systems, the system does not require treatment for soil-born pests or weeding.

The present kit does not require additional watering or fertilization, nutritional monitoring, specialized equipment and training, or electricity to operate aeration equipment.

One disadvantage associated with circulating hydroponic systems is the potential spreading of root diseases to all plants contained in the system. The problem is retarded in non-circulating systems. It is even less of a problem in small non-circulating systems such as the garden kit with only a few plants.

In an experimental model, a rectangular enclosure frame, 9.7 m×1.2 m, was constructed with 50×150 mm lumber at ground level in a fiberglass covered greenhouse. Approximately 50 mm of soil from inside the enclosure was excavated and removed. A tank was formed by placing two layers of 0.15 mm thick black polyethylene over the frame. Sheets of 13 mm thick plywood coated with white latex paint and reinforced with 19×64 mm lumber (to prevent sagging) were placed over the frame. Holes, 38 mm in diameter, were drilled in the plywood at 200 to 250 mm spacings.

Nutrient solution with a pH of 6.5 and an electrical conductivity of 1.0 mS was added to the polyethylene tank. It consisted of a 75 mm depth of water containing the following (in mg/Liter): N, 93; P, 33; K, 108; Ca, 110; Mg, 18; S, 23; Fe, 2; Mn, 1; Zn, 0.3; Cu, 0.3; B, 1; and Mo, 0.05. Fertilizer solutions included calcium nitrate, potassium nitrate, potassium phosphate, sulfates of K, Mg, Mn, Zn and Cu, and boric acid.

Leaf lettuce ('Green Ice') was seeded in tapered plastic containers, 40 mm diameter×218 mm deep, filled to the top with 160 ml of a medium (1 sand: 0.6 peat: 0.4 vermiculite) and watered by overhead mist in a seedling greenhouse. Care was taken to pack the medium uniformly, thus eliminating voids in the containers. The entire containers with 19-day-old seedlings were transplanted into the plywood sheets such that 47 mm of the seedling container extended above the surface and 158 mm remained below the plywood sheet. There were ten 4 mm diameter holes in the portion of the container located below the plywood sheet, four oval holes (12 mm×4 mm) in the lower 20 mm of the container, and a 7 mm diameter hole in the bottom of the container.

The bottom 25 mm of the containers was immersed in nutrient solution and the resulting capillary action was sufficient to wet the medium throughout the containers, thus automatically watering the plants. No additional maintenance was required from this time until harvesting.

After a 32 day growing period, the average harvest weights of lettuce from plant spacings of 200×230 mm, 200×250 mm and 250×250 mm were 157, 188 and 195 g/head, respectively. All heads were of marketable quality. In two other trials, lettuce from 200×230 mm spacings yielded 176 and 187 g/head at 35 days after transplanting.

At the end of the growing period, 30 mm of nutrient solution with an electrical conductivity of 0.5 mS and a pH of 7.5 remained in the tank. The water consumption rate was 14.4 liters/kg of harvested fresh weight of lettuce. In a simultaneous trial, the water consumption rate for "Green Mignonette" semi-head lettuce was 12.6 liters/kg of fresh head weight. Although the final nutrient solution level was 20 mm below the bottom of the containers, the media in the containers remained moist. However, when the nutrient solution level was 40 mm or more below the bottom of the containers, the medium in the tube was often dry.

Minimal root growth was observed from the 4 mm holes in the containers located between the original nutrient solution surface and the plywood cover. However, there was substantial root growth from the bottom hole and the oval holes of the containers which were immersed in nutrient solution at the start of the growing period. A significant portion of that root mass emerged in a conical form and was suspended in the air above the nutrient solution. Remaining roots floated both on and into the nutrient solution. Roots from adjacent plants intermingled with each other. When the plywood cover was lifted during the growing period, roots tore. Many roots suspended above the solution sank below the nutrient solution level, causing the foliage to wilt or lose its vigor. Thus, it is important not to disturb the plants while they are growing.

After leaf lettuce was transplanted in the capillary non-circulating hydroponic system, no additional watering, fertilization or monitoring of pH or electrical conductivity was required. Thus, the only cultural operations required for this system are: preparation of the nutrient solution, transplanting, harvest, cleanup and, perhaps, disease or insect control.

The basic invention is provided as a kit and contains a storage container with a lid, a bag of growing medium, four forestry tubes, and two packets of fertilizer. Additional fertilizer may be used.

The user would fill the forestry tubes with damp growing medium, packing it lightly by tapping the tube on a solid surface like a table top to remove air voids in the tubes since they will prevent capillary movement of water.

About 1.5 gallons of water (i.e. to a depth of about 4 inches) are added to the storage container with one packet of fertilizer.

The tubes are placed in the cover of the storage container and the seeds (1 or 2 seeds per tube) are planted at a depth of about ¼ inch in the medium. For example, a leafy lettuce cultivar, e.g. 'Green Ice', is recommended. Other short-term crops such as kaichoy are preferable over long-term crops such as tomatoes.

The storage container is placed in a sunny area that is protected from rain, such as under the overhang of a house, and left undisturbed to avert tearing of roots.

If the container is almost dry (in about 4 weeks), more water should be added, but only add about 1 quart or less at a time. Adding too much water may cause the roots (which have now been acclimated to being suspended in the air) to drown.

No extra fertilizer is needed in the closed system.

After the crop has been harvested, the container is washed with water and the medium is emptied from the tubes into a plastic bag and left to compost. That composted medium may be used for a third crop. The tubes are refilled with the remainder of the medium supplied with the kit, water and the other packet of fertilizer are added to the storage container, seeds are planted and a second crop of the year is under way.

This capillary, non-circulating hydroponic system appears to be a promising technique for home gardening, and for teaching situations where aeration or circulation cannot be easily supplied. Lettuce has been successfully grown in tanks consisting of buckets, large planting containers lined with plastic garbage bags, insulated coolers, and old refrigerators lined with polyethylene.

It is preferable that containers and lids used be relatively water tight, to maintain the closed system and allow receding of the nutrient solution without replenishment from rain or watering.

The system of the present invention can be adapted to crops with longer growing seasons and to select seedling containers which are easier to fill or have other advantages. The capillary non-circulating hydroponic system offers promising potential for production of intensive crops, for home gardens, for educational purposes and for growing plants used in research.

These and further and other objects and features of the invention are apparent in the disclosure, which includes the above and ongoing written specification, with the claims and the drawings.

DETAILED DESCRIPTION OF THE DRAWINGS

Figures 1, 2:
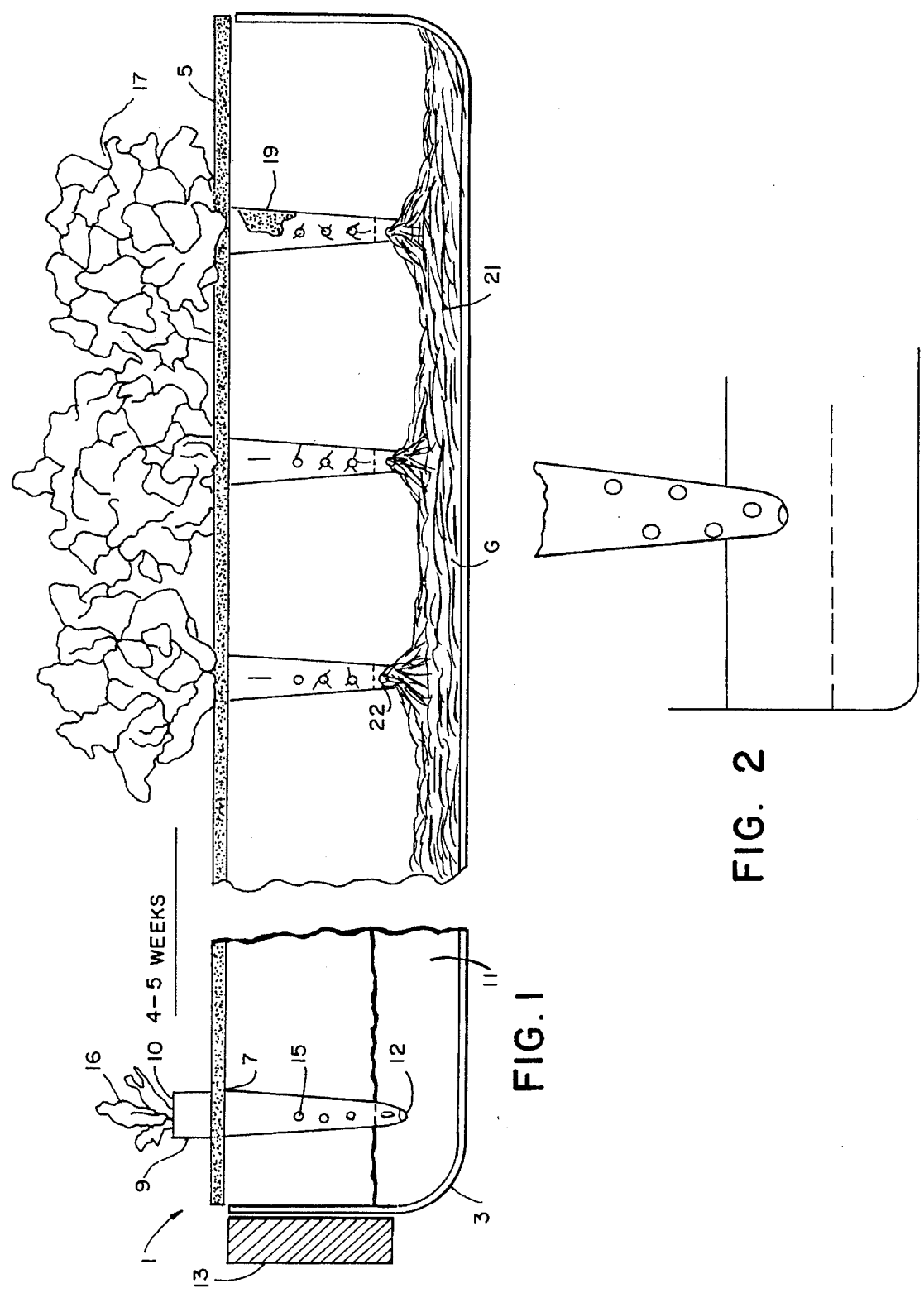
FIG. 1 is a cutaway side view of the capillary, non-circulating hydroponic system.
FIG. 2 is a side view of the bottom of the forestry tube and a preferred relationship to the receding nutrient solution levels.

A preferred non-circulating hydroponic growing system of the present invention is generally indicated by the numeral 1 in FIG. 1. The system or kit 1 incorporates a container 3, which may be a bucket, cooler or similar article but can preferably be a three to five gallon plastic, rectangular container when the system 1 is sold as a kit. A cover or lid 5 covers the container 3. The cover 5 is preferably constructed of a material which blocks visible light. Plural spaced tube-receiving apertures or holes 7 are provided in the cover 5 for receiving growing tubes 9. The tubes 9 and apertures 7, and further the cover 5 and container 3, mate in such a way so as to retard evaporation and prevent water from entering the container during the growing season. The tubes 9 are preferably tapered or frusto-conical in shape, and have open tops 10 at the larger end and root growing apertures 15 spaced from the opposite root end 12. Growing medium 19 is packed into the tubes 9 during the initial planting period, and seedlings 16 or seeds are planted therein. The root end 12 and at least one of the apertures 15 are initially submerged in a nutrient solution 11, which is a mixture of growing nutrients and water. In a preferred embodiment, the growing nutrients are specific to the type of plant to be grown, and the amount of nutrients mixed with the water in the solution 11 is sufficient to promote and sustain growth to full maturity.

In one experiment, "Green Ice" lettuce seedlings 16 were provided with a nutrient packet of (in milligrams per liter): N, 93; P, 33; K, 108; Ca, 110; Mg, 18; S, 23; Fe, 2; Mn, 1; Zn, 0.3; Cu, 0.3; B, 1; and Mo, 0.05. Fertilizer solutions included calcium nitrate, potassium nitrate, potassium phosphate, sulfates of K, Mg, Mn, Zn and Cu, and boric acid. The nutrient solution was mixed with approximately 3 inches of water, forming a growing solution having a pH of 6.5 and an electrical conductivity of 1.0 mS. Initially, the solution is drawn through the apertures 15 into the soil and to the seedlings' roots by capillary action. However, as the growing season progresses (four to five weeks for lettuce), the solution 11 drops below the root end 12 of the tube 9, as shown by the right side of the system in FIG. 1. The roots 21 protrude out of the apertures 15 while the water level is still above the aperture, and as the level recedes, the roots follow and expand throughout the container. The root systems proximal the apertures are suspended in midair near harvest time to provide aeration while the lower root systems are suspended within the nutrient solution to draw nutrients therefrom. The root systems become intertangled, and dislodging the lid 5 results in tearing in some of the roots. Therefore, it is necessary for the lid 5 to remain in place during the entire growing season of the plants.

Upon harvesting, the full grown plants 17 are removed from the reusable tubes 9, and the water and debris is removed from the container. The tubes are repacked with medium, the water and nutrients are replenished, and a second growing season ensues.

In an alternate embodiment, the container 3 can be a plastic film cradled within a wooden frame 13 or lining a hole of the appropriate size which the user digs. In either case, the cover 5 can be a sized piece of plywood which fits over the top of the excavation or frame, and which has plural spaced tube-receiving apertures 7. In all cases, it is necessary for the water levels to cover a portion of the tubes initially. It may then be allowed to recede below the bottoms to provide aeration to the upper root systems, yet still allow for suspension of lower root systems in the nutrient solution, thus allowing adequate uptake of nutrient solution.

In a preferred embodiment shown in FIGS. 1 and 2, the tubes are plastic forestry tubes having top widths F of 40 mm and fitted so as to extend above the cover 5 a distance C, which can be approximately 45 to 50 mm. The root ends 12 preferably are submerged in the solution 11 to a distance A, preferably about 25 mm, which covers at least one of the apertures 15. The original or initial nutrient solution depth B in the container 3 is about 75 mm. A depth D of about 160 mm is provided between the cover and the root end 12, which allows for a substantial amount of the plant roots to be in contact with the medium. Spacing E between tubes may vary according to the type of plant, as do the depths and widths of solutions, tubes and submergences, but a preferred spacing width is 225 mm for lettuce. A preferred ending nutrient solution depth G is 30 mm, leaving 20 mm between the nutrient solution and the root end 12.

The tubes 9 may incorporate vertical foils 22 to discourage spiraling of the roots around the tube.

While the invention has been described with reference to specific embodiments, modifications and variations of the invention may be constructed without departing from the scope of the invention, which is defined in the following claims.

I claim:

1. A non-circulating hydroponic plant-growing system, comprising a water impermeable container of selected dimensions having an open top and a closed bottom, a cover for the container with a selected number of spaced apertures at selected spacings, plural elongated reusable conical tubes with plural apertures at different levels from a lower narrow end towards an upper broader end of each tube, a growing medium for filling the tubes, seeds or seedlings for planting in the growing medium of a selected crop having a projected growing season till harvest in the medium, a predetermined amount of nutrient solution formed by mixing nutrients and water for adding to the container, said tubes being placed vertically in the apertures in the cover by suspending the upper ends of the tubes on the cover and the lower ends of the tubes in the solution above the bottom of the container to lift the nutrient solution to the seed or seedling by capillary action in the growing medium and cause roots of the seedling to grow downward through the medium and through the apertures, said water impermeable container having selected dimensions, said apertures having selected numbers and selected spacing and the predetermined amount of nutrient solution being selected to provide sufficient space and sufficient nutrient solution to sustain said desired crop for it's entire growing season without the need to replenish the solution in said container.

2. The system of claim 1, further comprising the apertures in the tube being in a spaced relationship from the lower ends upwards towards the cover and initially at least one of the lower apertures being covered by the nutrient solution.

3. The system of claim 1, further comprising a nutrient package having specific nutrients relating to specific plants to be planted in the growing medium.

4. The system of claim 1, further comprising the tubes being of root-impervious material.

5. The system of claim 1, further comprising the cover being of a light impervious material and the cover being attachable to the container in a sealing manner to prevent visible light from entering the covered container.

* * * * *